United States Patent [19]

Kerforne et al.

[11] 4,412,284
[45] Oct. 25, 1983

[54] METHOD OF CONTROLLING AN APPARATUS, WHICH IS OPERATED BY A SOLID-STATE PROCESSOR AND POWERED BY AN ELECTRIC MAINS, IN CASE OF A POWER FAILURE AND APPARATUS EMPLOYING SAID METHOD

[75] Inventors: Jean-Francois Kerforne, Evreux; Jacques Le Gars, Pacy; Michel Remery, Evreux, all of France

[73] Assignee: U.S. Philips Corporation, New York, N.Y.

[21] Appl. No.: 245,824

[22] Filed: Mar. 20, 1981

[30] Foreign Application Priority Data

Mar. 21, 1980 [FR] France ............................... 80 06414
Mar. 21, 1980 [FR] France ............................... 80 06415

[51] Int. Cl.³ ................................................ G06F 11/00
[52] U.S. Cl. ...................................... 364/200; 364/130; 364/184; 371/66
[58] Field of Search ... 364/200 MS File, 900 MS File, 364/130, 183, 184, 186, 187; 371/66

[56] References Cited

U.S. PATENT DOCUMENTS

| | | | |
|---|---|---|---|
| 3,188,452 | 6/1965 | Asbury | 371/66 |
| 3,286,239 | 11/1966 | Thompson et al. | 371/66 |
| 3,731,280 | 5/1973 | Shellin | 364/200 |
| 3,890,494 | 6/1975 | Meshek et al. | 371/66 |
| 4,003,030 | 1/1977 | Takagi et al. | 364/900 |
| 4,162,526 | 7/1979 | Gass et al. | 364/200 |
| 4,307,455 | 12/1981 | Juhasz et al. | 371/66 |

OTHER PUBLICATIONS

"A Minicomputer Power Fail Detection System", Chemical Instrumentation, vol. 7, No. 3, pp. 211-218, 1976, by Rayside et al.

Primary Examiner—Mark E. Nusbaum
Assistant Examiner—William G. Niessen
Attorney, Agent, or Firm—James J. Cannon, Jr.

[57] ABSTRACT

Method of operating a mains-powered processor-controlled electrical apparatus when the power fails and is subsequently restored and apparatus therefor. In the case of a power outage data identifying the program in progress is transferred for salvage to a memory. When power is restored and if the duration of the mains-power failure is smaller than a predetermined value, physical parameters which define the instantaneous state of the apparatus are sensed in response to an instruction from the processor in order to determine the conditions under which the program may be resumed by the apparatus.

14 Claims, 3 Drawing Figures

4,412,284

METHOD OF CONTROLLING AN APPARATUS, WHICH IS OPERATED BY A SOLID-STATE PROCESSOR AND POWERED BY AN ELECTRIC MAINS, IN CASE OF A POWER FAILURE AND APPARATUS EMPLOYING SAID METHOD

BACKGROUND OF THE INVENTION

1. Field of the Invention

The invention relates to a method of operating an apparatus by means of a solid-state processor which holds a plurality of selectable programmed routines, which apparatus is powered by an electric mains, and during a conditional operation controlling, within a limited volume of space, at least one physical parameter through a predetermined range of values in the case of a power failure during execution of a selected routine, said method comprising a plurality of subroutines for the salvage of identifier data associated wih said selected routine interrupted by said failure.

The invention also relates to an apparatus operated by a solid-state processor and powered by an electric mains in which during a conditional operation, within a predetermined volume of space, at least one physical parameter is controlled through a predetermined range of values, said processor holding a plurality of programmed routines, at least one of said routines being interruptable in case of power failure.

In general, the invention may be applied to all apparatus in which sequential programs are controlled by a solid-state processor and whose cost price does not justify the use of cyclic and permanent control means, for example domestic appliances such as laundry or dish-washing machines, cooking appliances etc.

2. Description of the Prior Art

In appliances, equipped with electromechanical programming devices, the instantaneous setting in the case of a power failure is preserved but in the case of appliances whose operation is controlled by a solid-state processor a power failure results in the destruction of the data identifying the program in progress; when the power-supply voltage is restored, this means that the program of the apparatus is restarted without knowing exactly which part of the program has already been carried out. This problem is overcome by providing the apparatus with a data-saving device to which the data necessary for the subsequent continuation of the program are transferred and in which they are stored as soon as a failure occurs.

French Patent Specification no. 2,297,273 describes an electronically controlled washing machine equipped with a data-saving device. If the power failure is brief (approximately 8 seconds) the program is continued at the point where it was interrupted, employing the saving data. If the interruption is longer an accummulator maintains the logic circuit in the state which it occupied at the instant of failure. When power is restored the memory devices are re-activated in the reset state.

However, in certain cases the use of the saved data for exactly reprogramming the apparatus at the point of the program where the power failure occurred may be undesirable for said apparatus or for objects to be treated by said apparatus. Indeed, the absence or incorrect value of certain physical parameters at the instant that power is restored, compared with the values which would normally occur, may sometimes impair a correct execution of the program. When proceeding as described in the event of a longer power failure, the user himself should select a new program when the power is restored.

U.S. Pat. No. 3,959,778 describes a device for salvaging processor data. When a power failure is detected during execution of a program, the data present in the main memory is transferred to a peripheral and non-volatile memory.

However, the device only comprises means for detecting a power failure, but does not comprise means for organizing the restarting process at the instant that power is restored.

It is an object of the invention to provide a method where the apparatus itself determines whether the interrupted programmed routine is to be stopped or continued when the power is restored and in case of continuation determined under which condition restarting may be effected.

SUMMARY OF THE INVENTION

The method of the invention comprises a power restoration subroutine. This power restoration subroutine determines whether or not the interrupted selected routine may be restarted after power restoration, and in case that a restart is allowed, determines the restart conditions.

The object of the invention is achieved in that the apparatus is equipped with a control device comprising means for organizing the restarting process.

An apparatus in accordance with the invention comprises sensing means for sensing a physical parameter a control device annexed to said processor, for controlling in conjunction with the processor the operations in case of power failure and in case of power restoration.

In this respect "physical parameter" is to be understood to mean for example a temperature, pressure, volume, voltage etc. as well as electrical binary logic states.

The method in accordance with the invention equally applies to machines whose processor is programmed in accordance with a "functional" mode or a "sequential"-'mode.

A "functional" mode is to be understood to mean a programming whose progress is primarily conditioned by the measurement of physical parameters to be taken into account for a correct execution of an operation, for example in a washing machine operated by a solid-state processor the measurement of the turbidity, which prevents the program from proceeding as long as the rinsing water is not perfectly clear.

A "sequential" mode is to be understood to mean a programming which divides the program into a certain number of basic "steps", which are used completely or partly, depending on the desired program, and whose execution is mainly governed by requirements with respect to time.

Suitably, the program is not continued if the duration of the power supply failure is greater than a reference value. In most cases restarting an interrupted program after a prolonged failure would make no sense. For example, it makes no sense to continue baking a load in a baking appliance if the baking process has been interrupted for more than one hour. Suitably, the length of the power supply failure is measured by sensing a residual voltage across an auxiliary power hold source which powers a memory in which data identifying the interrupted program are preserved during said failure, which auxiliary power hold source is charged prior to the power failure and is gradually discharged during said failure. The power consumed by the memory during the failure is a measure of the duration of the falure. Suitably, at least one physical parameter defining the instantaneous state of the apparatus is measured after power restoration in response to a command from the processor, the measured value being compared with a reference value which corresponds to the phase of the selected program to which the apparatus has proceeded. Thus, the processor has a criterion for the instantaneous state of the machine, in order to determine the conditions for restarting.

Suitably, the detection means comprise comparator circuits which in response to the result of a comparison between two voltages generates signals whose level corresponds to a specific position of the elements which receive said signals. Said elements are then blocked or activated.

The invention also ensures that auxiliary functions are performed which allow for most of the transient effects which may occur during a power failure and thereby ensures maximum operational security of the apparatus employing the method.

By design of the apparatus, the time during which the salvaged data can be preserved essentially depends on the auxiliary power hold source which powers the shift register. By a suitable choice of said source said duration may be varied as a function of the operation to be performed by the appliance, enabling a preservation time of several days to be obtained by means of a single high-quality electrolytic capacitor. Such a long duration which is superfluous in the event of an accidental power failure, may be useful in certain cases in which the power to the appliance is intentionally interrupted for reasons of safety or economy.

BRIEF DESCRIPTION OF THE DRAWINGS

The invention will now be described in more detail with reference to the accompanying drawing.

DESCRIPTION OF THE PREFERRED EMBODIMENT

Figure 1:
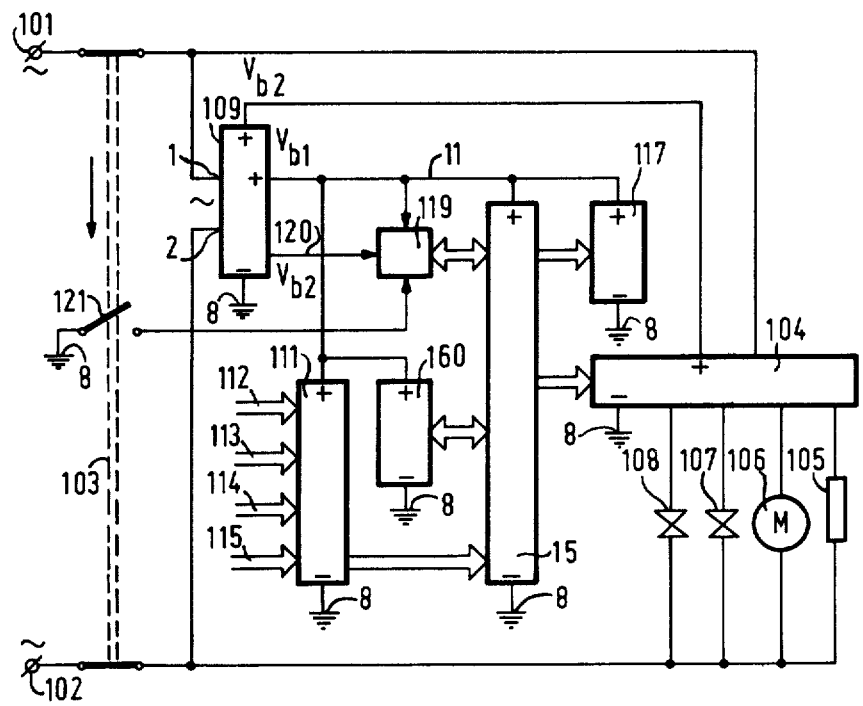
FIG. 1 represents the block diagram of an apparatus employing the method in accordance with the invention.

Referring now to FIG. 1, via a double circuit breaker 103, two mains terminals 101 and 102 are connected to a control unit 104 and to the commoned first terminals of some elements which are characteristic of the type and function of the apparatus. Thus, in a washing machine the element 105 will be an immersion heater, the element 106 a motor, and the elements 108 and 107 two electric valves. The second terminals fo the elements are connected to the control unit.

At 1 and 2, after the switch 103, the mains is also connected to a rectifier and stabilizer unit 109 which supplies two positive direct voltages Vb1 and Vb2, whose common negative pole is connected to ground.

Via its input channels 112, 113, 114 and 115 a multiplexer circuit 111 receives the data necessary for the execution of the program, for example the manual selection of a programme via the line 112 and, depending of the type and function of the apparatus in question, data relating to the value of physical quantities such as the temperature or others via the other channels.

An output channel of the multiplexer 111 is connected to a microprocessor 15 to which a read-only memory 160 is connected, said microprocessor comprising two output channels which are respectively connected to the control unit 104 and to a display unit 117.

The positive supply terminals of the multiplexer 111, of the microprocessor 15, of the memory 160 and of the display unit 117 are connected to a conductor 11, which is at the voltage Vb1, while the negative power supply terminals are connected to ground.

The microprocessor 15 is also connected to the control device 119 via a two-way channel. The control device is connected to the grounding point via a switch 121, which is mechanically coupled to the double circuit-breaker 103.

The microporcessor 15 in conjunction with the memory 160 receives instructions and data via the multiplexer 111 and supplies sequential instructions to the control unit 104 for activating the elements which are characteristic of the type and function of the apparatus.

In parallel therewith, the microprocessor 15 sends instructions to the unit 117 which displays the nature of the selected program and the progress thereof.

One of the principal functions of the control unit 119 is to protect data identifying an interrupted routine, said unit being frequently referred to as salvage unit or device.

In the event of a power failure the salvage unit 119 detects a difference in the rate at which the voltage across the conductors 11 and 120 decreases and immediately sends an instruction to the microprocessor to transfer the data of the program in progress before the voltage Vb1 has decreased below a specific lower limit value.

During the failure condition, the data is stocked in a memory of the unit 119, which memory is for example of the CMOS type with a very low power consumption and is energized by an auxiliary power hold source, for example a storage capacitor which replaces the sources Vb1.

When the power returns the duration of the power failure is measured; indeed, independently of the problem of salvaging the data, it may be desirable to inhibit continuation of the program after a power failure which has persisted too long, be it only for the reason that the apparatus may be without supervision at the moment that the power returns. If a storage capacitor is used as auxiliary power hold source, the duration of the failure is found by measuring the residual voltage across the capacitor, which was fully charged before the occurrence of the failure, said capacitor being suitably the capacitor which energizes the salvage memory incorporated in the unit 119. The duration of a power failure may also be derived from the reading of a counter, which is actuated when the power failure commences and which counts the number of clock pulses.

The duration after which it is desirable to inhibit continuation may also depend on the point to which the program has proceeded at the instant of failure and on the nature of the program. For example, in a cooking appliance, cooking of a dish of vegetables may be resumed after an interruption of a quarter of an hour, while such a duration would be disastrous when baking a bread. If said duration is smaller than a predetermined value, various physical parameters defining the instantaneous state of the apparatus are measured by the microprocessor. The microprocessor compares these physical parameters with reference values corresponding to the phase of the program to which the apparatus has proceeded. The result of this comparison determines the conditions for continuation of the interrupted program.

However, if the result of the comparison shows that the conditions for continuation of the program are not satisfied, the microprocessor will not proceed with the program and resets the apparatus to the state existing at the beginning of each program.

When power is restored, a code is detected in the data received and returned by the salvage unit 119, an incorrect code indicating an incorrect data salvage which inhibits the continuation of the program in progress, said code being constituted by a first word entered into a shift register which is kept energised during the power failure and which constitutes the salvage memory of the unit 119.

If the result of the comparison of the state of the apparatus with the reference values shows that the conditions for a continuation of the program are not satisfied, the microprocessor proceeds to restore them. Some of said conditions may be physical parameters, in which case the microprocessor allows the program to continue and simultaneously replaces said physical parameters by their reference values in conformity with the said programme; for example in a washing machine whose operation is controlled by a microprocessor, the microprocessor, after power restoration, instructs the temperature of the washing liquid to be measured and compares said temperature with the reference value corresponding to the phase of the washing programme which the machine has reached and, if the measured temperature is insufficient, gives an instruction to reheat the washing liquid and at the same time continue the program.

The microprocessors in certain types of apparatus are programmed in program "steps" in analogy with the operation of electromechanical programming devices employed in a previous generation of apparatus.

In this type of apparatus the total operating sequence is divided into a certain number of basic "steps" each corresponding to the execution of a function and proceeding depending various requirements; a certain number of these "steps", which are differently situated in the sequence, may be "skipped" depending on the nature of the program selected by the user.

For the use of the method in accordance with the invention in such an apparatus when it is found that after comparison of the state of the apparatus with the reference values the conditions for a continuation the program are not satisfied, the microprocessor sets the machine to the state corresponding to a program step which precedes the step during which the power failure occurred.

Figure 2:
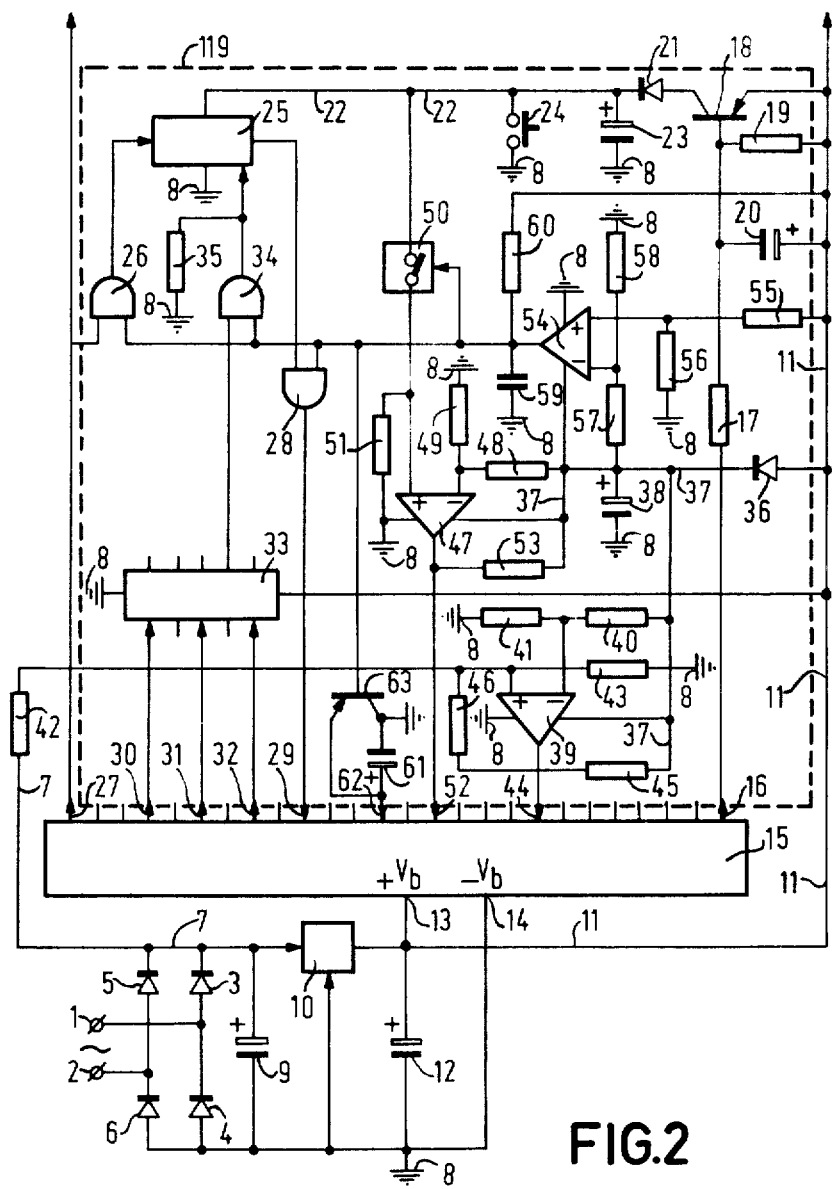
FIG. 2 represents the block diagram of a microprocessor and its power supply, equipped with control circuitry in accordance with the invention.

FIG. 2, whose reference numerals correspond to those used in FIG. 1, represents the control device 119 in accordance with the invention within a dashed frame.

The two mains terminals 1 and 2 are respectively connected to the commoned anodes and cathodes of two pairs of rectifier diodes 3, 4 and 5, 6.

The commoned cathodes of the diodes 3 and 5 are connected to a positive line 7 of a non-stabilized voltage supply, while the commoned anodes of the diodes 4 and 6 are connected to a common ground, a smoothing capacitor 9 being included between the line 7 and earth.

The line 7 is connected to the input of a voltage stabilizing circuit 10, whose output is connected to a positive line 11 carrying a stabilized voltage Vb, a smoothing capacitor 12 being included between the line 11 and ground.

Two power supply pins 13 and 14 of a microprocessor 15 are respectively connected to the line 11 and to the earth, while an output pin 16 of said microprocessor is connected to the base of a PNP switching transistor 18 via a resistor 17, a resistor 19 and a capacitor 20 being arranged between said transistor and the line 11.

The collector of the transistor 18 is connected to the anode of an isolating diode 21, whose cathode is connected to a positive line 22, a storage capacitor 23 being included between said positive line and the grounding point 8, which storage capacitor is shunted by a switch 24 which is mechanically coupled to the "start-stop" switch of the apparatus.

The positive power-supply pin of a shift register 25 is connected to the line 22 and the negative power-supply pin to the ground; the "data-input" of the register 25 is connected to the output of an "AND"-gate 26, of which one input is connected to a "general data" output pin 27 of the microprocessor 15, while the "data output" of said register is connected to an input of an "AND" gate 28, whose output is connected to an input pin 29 of the microprocessor 15.

Two "coding" output pins 30, 31 and one clock output pin 32 of the microprocessor 15 are connected to the corresponding input pins of a demultiplexer circuit 33, whose power-supply pins are respectively connected to the line 11 and the ground.

One of the "clock" outputs of the demultiplexer 33 is connected to an input of an "AND" gate 34, whose output is connected to the "clock" input of the register 25, a resistor 35 being included between the output of said gate and the ground.

The anode of an isolating diode 36 is connected to the line 11, while the cathode is connected to a positive line 37, a storage capacitor 38 being included between said positive line and the ground.

The negative input of the first comparator circuit 39 is connected to a resistor bridge 40, 41 included between the line 37 and the ground, while the positive input is connected to a further resistor bridge 42, 43 included between the line 7 and the earth.

The output of the comparator 39, which is connected to an "interrupt" input pin 44 of the microprocessor 15, is connected to the line 37 via a resistor 45 and to the positive input via a resistor 46.

The positive input of a second comparator circuit 44 is connected to a first resistor bridge 55, 56 included between the line 11 and the grounding point 8, while the negative input is connected to a second resistor bridge 57, 58 included between the line 37 and the ground.

The output of the comparator 54, which is decoupled from ground by means of a capacitor 59, is connected to the line 11 via a resistor 60, to the control input of the electronic switch 50 and to the second inputs of the gates 26, 28 and 34.

The negative input of a third comparator circuit 47 is connected to a resistor bridge 49, 48 included between the line 37 and the ground, while the positive input is connected to the line 22 via an electronic switch 50, a resistor 51 being included between said positive input and the ground.

The output of the comparator 47 is connected to a "validation" input 52 of the microprocessor 15 and via a resistor 53 to the line 37.

A capacitor 61 is included between a reset input 62 of the microprocessor 15 and the ground, said capacitor being bypassed by the emitter-collector path of a PNP transistor 63, whose base is connected to the output of the comparator 54.

In order to simplify the following description, only the connections of the microprocessor 15 which directly relate to the data-salvage device in accordance with the invention are shown, to the exclusion of other connections relating to the data inputs and to the outputs for instructions which are specific of the apparatus in which it is incorporated, which may be a laundry or dish-washing machine, a cooking appliance etc.

The function of the control device employed in the apparatus in accordance with the invention is to salvage the data stored in the microprocessor 15 at the instant that the current on the mains terminals 1 and 2 is interrupted.

Figure 3:
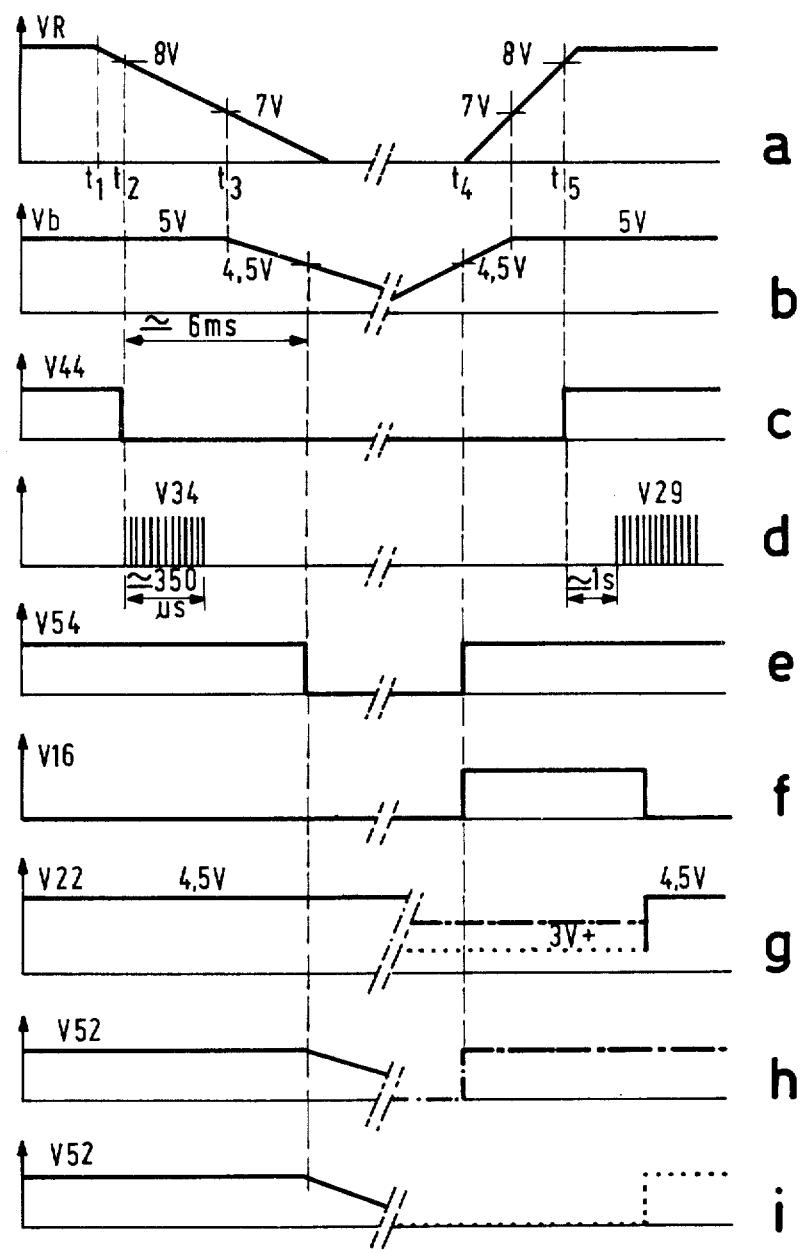
FIGS. 3a to 3i are voltage levels as a function of time at different points of the diagram of FIG. 1.

Referring now to FIGS. 3a and 3b, which respectively represent the voltages on the line 7 (VR) and on the line 11 (Vb), it will be seen that at the instant $t_1$ at which the failure occurs the voltage VR begins to decrease, while the voltage Vb remains stable until the instant $t_3$ corresponding to that value of VR which no longer permits stabilization; this is achieved by giving the smoothing capacitor 12 a higher value than the smoothing capacitor 9.

In the case of a nominal supply voltage of 5 V for the microprocessor 15, this voltage may decrease down to 4.5 V without impairing the microprocessor operation; thus between the beginning of the failure and the critical threshold of the voltage Vb a time interval of a few milliseconds is available which is utilized by the data-salvage device in accordance with the invention.

During normal operation the voltage applied to the positive input of the comparator 39 from the line 7 is higher than that of the negative input, which is determined by the resistor bridge 40, 41 via the line 11; in this situation the output of the comparator 39 supplies a "high" level to the "interrupt" input 44 of the microprocessor 15 (FIG. 3c).

In the case of a power failure the voltage VR on the line 7 begins to decrease at the instant $t_1$ (FIG. 3a) and, when it reaches 8 V at the instant $t_2$, the output of the comparator 39 changes to a "low" level (FIG. 3c) which, when applied to the input 44 of the microprocessor, interrupts the normal program of said microprocessor in order to replace it by a power-outage subroutine. This subroutine allows the clock pulses to be applied from the output 32 to the gate 34 via the demultiplexer 33 by means of a logic code on the outputs 30 and 31 and the "output" of the data necessary for a possible continuation of the normal mode of operation via the pin 27.

During this time the gates 26, 28 and 34 are open and the switch 40 is closed, their control inputs being "high" (FIG. 3e) owing to the state of the output of the comparator 54, whose voltage on the positive input is higher than voltage on the negative input; in this situation the clock pulses are received from the gate 34, causing the register 25 to be loaded with the data issuing from the gate 26 (FIG. 3d).

After a time interval necessary for loading all the data into the register 25, which interval is approximately 350 µs, the "failure" subroutine of the microprocessor changes the logic code of the outputs 30 and 31, and also interrupts the loading operation; it is to be noted that for reasons of clarity this loading sequence is considerably simplified in FIG. 3d.

From the instant $t_3$ (FIG. 3a) the voltage Vb on the line 11 begins to decrease and when it reaches the threshold of 4.5 V the output of the comparator 54 changes, thereby closing the gates 26, 28 and 34, opening the switch 50 and turning on the transistor 63 (RESET) (FIG. 3e).

Simultaneously, the decrease of the voltage Vb on the line 11 causes the diode 21 to be cut off, thereby maintaining the high charge of capacitor 23 as a result of this, the C-MOS register 25 which has a very low power consumption, remains energized without the possibility of an erroneous read-out via its data inputs and outputs because the gates 26 and 28 are blocked.

The decrease of the voltage Vb on the line 11 also causes the diode 36 to be cut off, which for a certain time interval maintains the charge of the capacitor 38 which energizes the comparators 39, 47 and 54 via the line 37.

When the power is restored the voltage VR at the instant $t_4$ (FIG. 3a) is sufficient to enable the voltage Vb to increase again to 4.5 V (FIG. 3b) and again energize the comparators, which first of all causes the gates 26, 28 and 34 to be opened and the switch 50 to be closed (FIG. 3e). However, the transistor 18 is held in the cut-off state by a positive voltage applied to its base from the output 16 of the microprocessor 15 (FIG. 3f); in this situation the capacitor 23 retains its charging voltage, which it held at the instant that power was restored, this residual voltage being applied to the positive input of the comparator 47 via the switch 50.

The value of the residual voltage of the capacitor 23 at the instant that power is restored of course depends on the duration of the power failure; however, there is a threshold value of the supply voltage of the register 25 below which the preservation of the stored data is no longer guaranteed, for example 3 V.

If the residual voltage at the instant that the power supply is restored is higher than said critical value (dotted lines FIG. 3g), the output of the comparator 47 will supply a high level (FIG. 3h) to the "validation" input 52 of the microprocessor 15 at the instant $t_4$, which enables a transfer of the salvaged data contained in the register 25 to the microprocessor 15 by way of the input terminal 29 via the gate 28 (FIG. 3d).

In the case that the value of the residual voltage is smaller than the threshold level (dotted line FIG. 3g) the output of the comparator 47 will remain "low" (FIG. 3i) and the microprocessor is set to a stand-by position in anticipation of re-programming.

The instant at which the choice is made between these two possibilities is the instant $t_5$ (FIG. 3a) at which the output of the comparator 39 again supplies a "high" level to the "interrupt" input 44 of the microprocessor; therefore, it is of importance that the transistor 18 is still cut off at this instant, which is realized by delaying the instant at which the signal appears on the output 16 of the microprocessor which turns on transistor 18 (FIG. 3f), which signal enables capacitor 23 to be recharged.

Steps are taken in order to cope with certain situations which may occur; thus, after the registers have been loaded, the microprocessor 15 remains in a waiting loop of approximately one second if normal operation could be restored in the case of a mains voltage decrease which is too slow.

Equally, in order to allow for an erroneous power return, the re-transfer of the data stored in the register to the microprocessor is also effected after a waiting loop of one second.

After power has been restored and before the voltage Vb feeding the microprocessor has reached a sufficient value, the output level on pin 16 may therefore assume incorrect values; in order to preclude partial recharging of the capacitor 23 by an accidental turn-on of transistor 18 before the value of the residual voltage has been taken into account, said transistor is kept cut-off by the inclusion of the capacitor 20, which provides a positive base bias while the voltage Vb is increasing.

The gate 34, which is blocked when the voltage Vb is lower than 4.5 V, prevents any transfer of spurious signals to the clock input of the register 25, which signals may affect the content of said register and which result from random operation of the microprocessor 15 and of the demultiplexer 33 in the case of an insufficient supply voltage.

The switch 24 for short-circuiting the capacitor 23 is mechanically coupled to the common "start-stop" switch (not shown) of the apparatus, in such a way that it is closed after the terminals 1 and 2 are no longer energized and which opens before said terminals are connected to the mains; in this way it is avoided that the device responds to a voluntary power cut-off of the apparatus in the same way as to an accidental mains power failure.

The use of the control method and of the data-salvage device in accordance with he invention is illustrated by way of example by its use in a laundry washing machine whose operation is controlled by a microprocessor.

The microprocessor (15) used is commercially available from the Signetics company under the reference 8035, the demultiplexer (33) being of the type "74 LS 139" and the shift register (25) being formed by a double "4006" from the same company.

Table I, by way of example lists all the program "steps" of a washing machine whose microprocessor is programmed "step by step".

TABLE I

| Operations | No. of steps | Functions |
|---|---|---|
| prewashing | 1 | filling — stirring |
| | 2 | heating — stirring |
| | 3 | stirring |
| | 4 | draining — stirring |
| washing | 5 | filling — stirring |
| | 6 | heating |
| | 7 | stirring |
| | 8 | stirring |
| | 9 | stirring |
| | 10 | stirring |
| | 11 | stirring |
| | 12 | replenishing |
| | 13 | draining — stirring |
| 1st rinse | 14 | filling — stirring |
| | 15 | draining — stirring |
| 2nd rinse | 16 | filling |
| | 17 | filling + addition detergent |
| | 18 | stirring |
| | 19 | draining |
| 3rd rinse | 20 | filling — stirring |
| | 21 | detection of motor direction |
| | 22 | draining + fast rotation |
| | 23 | spin drying |
| 4th rinse | 24 | filling |
| | 25 | filling + softener addition |
| | 26 | stirring |
| | 27 | stip with full tub |
| | 28 | detection of motor direction |

TABLE I-continued

| Operations | No. of steps | Functions |
|---|---|---|
| spin drying | 29 | draining + fast rotation |
| | 30 | spin drying |
| | 31 | spin drying |
| | 32 | stop |

The following flow chart as well as the accompanying description relate to the detailed logic used for this specific use.

TABLE II

Power outage subroutine failure

↓

| 1000 → Accu |

↓

| 0100 → counter register |

↓

| output sub-program |

↓

| word no. 1 → Accu. |

↓

| 1000 → counter register |

↓

| output sub-program |

↓

| word no. 2 → Accu. |

↓

| 1000 → counter register |

↓

| output sub-program |

↓

| word no. 3 → Accu. |

↓

| 1000 → counter register |

↓

| output sub-program |

↓

| word no. 4 → Accu. |

TABLE II-continued

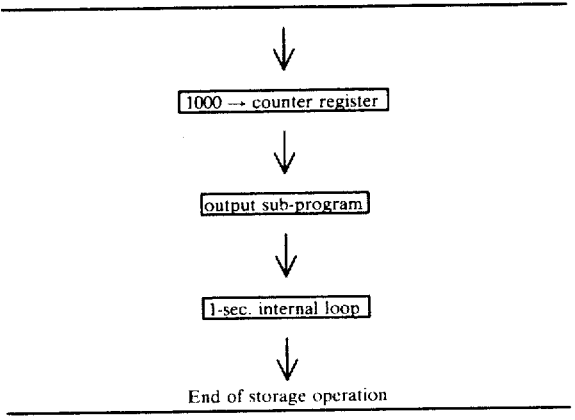

End of storage operation

TABLE III

Detail of the output sub-program

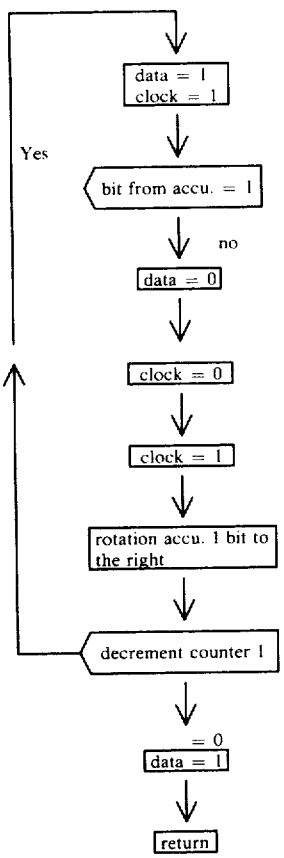

Data Salvage (Table II)

When the microprocessor 15 receives an interrupt instruction as a result of the detection of a voltage drop on the inputs of the stabilizer 10, it transfers all the data necessary for a subsequent continuation of the washing sequence to the register 33, namely:

a four-bit code (1000) for the register position, a first eight-bit word containing the number of one of the selected washing programs (cotton 95°, synthetic fabrics, woolens, etc.) and the selected options, for example "prewash" on request, an "economy program" with reduced temperature and water level, "half load" also with reduced water level, a second eight-bit word representing the washing temperature and the spin drying speed, a third eight-bit word representing the display data for the washing cycles associated with the program and the selected options (prewash, wash, four rinsing cycles, stop with full tub, final rinse), a fourth eight-bit word representing the progress of the washing sequence at the instant of failure (number of steps from 1 to 32, Table I).

Each of the introductory cycles of the said four words is prepared by the output sub-program which is elaborated in Table III.

The above data transfer is effected in approximately 350 μs and after a last output sub-program, the microprocessor 15 is set to a one-second waiting loop which serves to prevent the operation of the machine being resumed in the case of a mains voltage which decreases too slowly.

Restoring (Table IV)

The microprocessor 15, which is reset to the beginning of its program when power is restored proceeds with the following operations:

cancellation of the instructions from the control unit 104 (FIG. 1), thereby rendering the machine inoperative, turning off the seven-segment displays and light emitting diodes of the display unit 117, checking the residual supply voltage of the salvage register 25 by sensing the output of the comparator 47.

If the residual supply voltage of the capacitor 23 is smaller than 3 V, the machine is set to a stand-by state in anticipation of a new washing program; otherwise operation continues as follows:

instruction to recharge the capacitor 23, read-out of the code; this code is designed to enable a shift to the right of the register and to allow for this during the read-out of the four salvaged words—which code is written as: 1000, valid codes: 1000 and 100, if the first or the second bit which is read is 1, the salvage operation is invalidated and the machine is also set to stand-by in anticipation of a new washing program.

This tolerance of a shift by one position of the register enables the system to allow for the effect of a spurious pulse occurring at the instant at which power is restored and which could be mistaken for a clock pulse by said register.

successive read-out of the four eight-bit words from the register 25 restoring the operational parameters in the internal register (initialization), stop-cycle test. In two cases operation should not be continued from the step interruption occurred:

(a) stopping during a heating step, operation is continued with the preceding filling step in order to avoid heating without water;

interrupted during step 2, restart step 1 (table I) interrupted during step 6, restart step 5.

(2) interrupted during a spin drying step, restarting from a preceding filling step, in order to ensure a correct balancing of the load of laundry during spin drying (start spin drying with full tub).

interruption during step 22 or 23, restart step 20 interruption during step 29, 30 or 31, restart step 26.

TABLE IV
Restoration

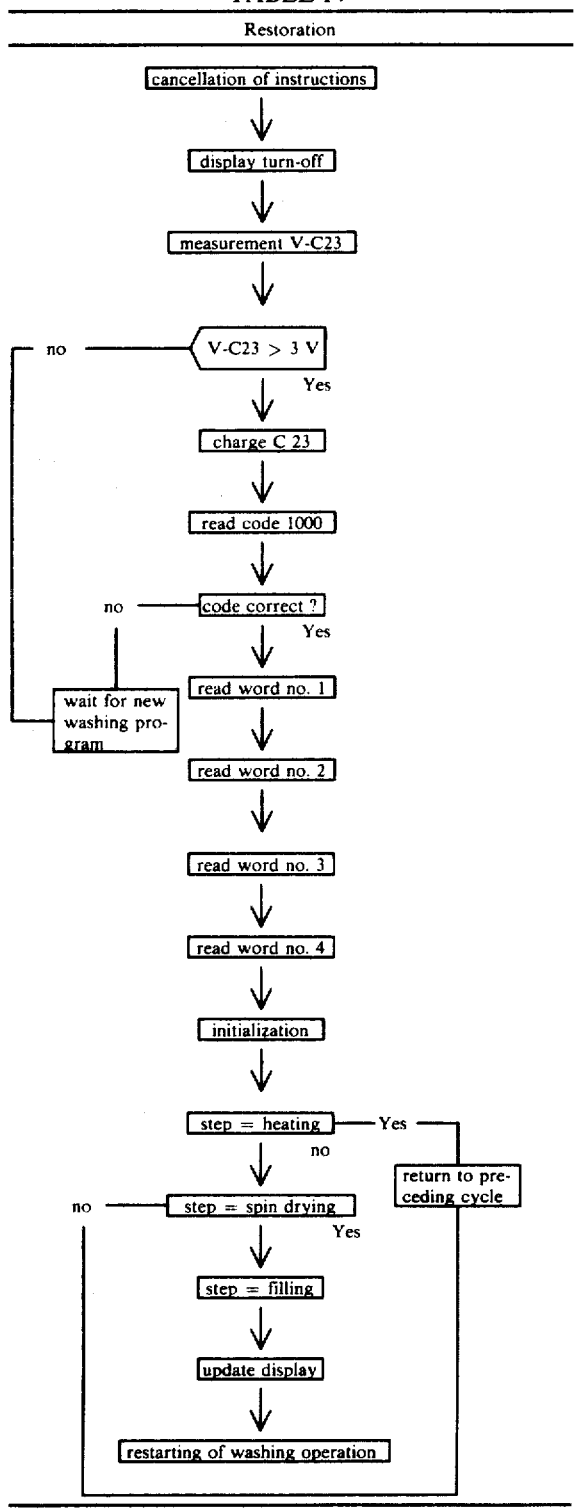

Stopping with full tub (step 27) will not be effected for a second time if the machine stops at one of the cycles 29, 30 or 31, owing to the presence of a bit of the fourth salvaged word, which becomes "1" at the instant that the "stop with full tub" function is executed.

Updating the display

Restarting of the washing sequence.

What is claimed is:

1. A method of operating an apparatus by means of a solid state processor, which apparatus is powered by an electric mains and controlling, during a conditional operation, within a limited volume of space, at least one physical parameter through a predetermined range of values, which processor holds a plurality of selectable programmed routines, said method comprising the following subroutine steps which are activated by the machine in case of a power failure during execution of a selected routine, (1) a power outage subroutine, comprising the steps of:
 sensing the beginning of said power failure;
 interrupting said selected routine;
 enabling a timer means to start from an initial position;
 saving identifier data associated with said selected routine, and indicating the point at which the interruption of said selected routine occurred;

(2) a power restoration subroutine comprising the steps of:
 sensing the end of said power failure;
 disabling said timer means and sensing its actual setting;
 determining the duration of said power failure;
 determining whether said duration exceeds a predetermined limit;
 generating an "excess" signal if said duration exceeds said predetermined limit; generating a "non-excess" signal if said duration does not exceed said predetermined limit;
 under control of an "excess" signal jumping to a termination subroutine;
 under control of a "non-excess" signal proceeding with the power-restoration subroutine;
 fetching said identifier data;
 sensing the value of at least one physical parameter;
 determining a reference value for said physical parameter at said point at which the interrption of said selected routine occurred;
 comparing the value of said sensed physical parameter with said determined reference value for said physical parameter, and determining whether said sensed physical parameter has a value lying within a predetermined tolerance from said reference value for said physical parameter;
 generating an "acceptable" signal if said sensed physical parameter has a value lying within said predetermined tolerance; generating a "conditionally acceptable" signal if said sensed physical parameter has a value lying outside said predetermined tolerance;
 under control of an "acceptable" signal restarting said interrupted routine;
 under control of a "conditionally acceptable" signal, determining from which point said interrupted routine has to be restarted in order to restore said parameter and proceed with said interrupted routine.

2. A method as claimed in claim 1, wherein said timer means is provided with an auxiliary power hold source for powering a memory holding said identifier data during said duration, which auxiliary power hold source has a controlled output level at said initial position and is drained during said power failure from said level to a threshold level, said duration being determined by measuring a residual voltage on said auxiliary power hold source and if said threshold level has been reached, said excess signal being generated.

3. A method as claimed in claim 1, wherein said programmed routines each comprise at least one step, controlled by the required value of a physical parameter identifying said step, said "conditionally acceptable" signal controlling a restarting of said interrupted routine while simultaneously generating a restore signal for restoring said physical parameter to said required value.

4. A method as claimed in claim 1, wherein said "conditionally acceptable" signal controls a jump to said termination subroutine if said physical parameter is nonrestorable.

5. A method as claimed in claim 1, where said programmed rountines comprise at least an earlier and a later step, wherein said power failure occurs during execution of a later step, said "conditionally acceptable" signal controlling a jump to said earlier step.

6. A method as claimed in claim 1, wherein a multibit code number is inserted into said indentifier data, wherein said fetching of identifier data comprises detecting said code number in said identifier data, and wherein incorrect detection of said code number controls a jump to said termination subroutine.

7. An apparatus operated by a solid-state processor and powered by an electric mains, in which during a conditional operation, within a predetermined volume of space, at least one physical parameter is controlled through a predetermined range of values, said processor (15) holding a plurality of programmed routines, at least one of said routines being interruptable in case of power failure, said apparatus comprising:
(a) converting means, for receiving a primary supply voltage from an electric mains, and therefrom producing a secondary supply voltage on a first output (11), said first output being connected to a supply input of said processor;
(b) sensor means for sensing said physical parameter;
(c) a control device (119) annexed to said processor, having a first input connected to said first output, and comprising:
(c₁) an auxiliary power hold source (23), comprising a source input for receiving said secondary supply voltage until the beginning of said power failure in said mains, comprising a source output for presenting an auxiliary voltage to a further element of said control device, further comprising current draining means for draining said auxiliary voltage from a nominal level to a lower threshold level within a predetermined length of time from said beginning;
(c₂) said further element comprising storage means (125) for storing identifier data of said interrupted routine from said beginning for said predetermined length of time, said storage means having a data path to said processor;
(c₃) detecting means, connected to said converting means, for generating a failure indicating signal upon detecting said beginning, generating a restart signal upon detecting the end of said power failure, and generating under control of said restart signal a validation signal if said auxiliary voltage has not yet reached said lower threshold level;
(c₄) gating means in said data path, for enabling, under control of said failure indicating signal, a transfer of said identifier data from said processor to said storage means and for enabling, under control of said validation signal, a transfer of said identifier data from said storage means to said processor.

8. An apparatus as claimed in claim 7, wherein said detecting means comprising:
(1) a first comparator circuit (39), comprising a first input terminal connected via a first voltage divider to said secondary supply voltage and a second input terminal connected via a second voltage divider to said primary supply voltage, for comparing said secondary supply voltage with a fraction of said primary supply voltage, generating a first failure indicating signal on a first comparator output in the case of a deviation from a first predetermined value, and generating a first restart signal on said first comparator output upon detection of a recovery to said first predetermined value;
(2) a second comparator circuit (54), comprising a third input terminal connected to said first output and a fourth input terminal connected to a first reference power source (38, 57) for comparing said secondary supply voltage with a first reference voltage, generating a second failure indicating signal on a second comparator output in the case of a deviation from a second predetermined value, and generating a second restart signal on said second comparator output upon detection of a recovery to said second predetermined value;
(3) a third comparator circuit (47), comprising a fifth input terminal connected to said source output via a second line and a sixth input terminal connected to a second reference power source (48, 49, 38), said second line including a second switch having a control input for receiving said second restart signal, for comparing, after said second switch has been closed by said second restart signal, said second reference voltage with the residual voltage of said auxiliary power hold source, generating said validation signal on a third comparator output if said residual voltage is higher than said threshold level determined by said second reference power source.

9. An apparatus as claimed in claim 7, said auxiliary power hold source comprising:
(1) a capacitor (23) for receiving said secondary supply voltage until said beginning and supplying said auxiliary voltage from said beginning;
(2) a first line having one end connected to said source output and the other end to a first switch (24), said first switch being connected to the mains on-off switch of the apparatus for totally draining said auxiliary power hold source.

10. An apparatus as claimed in claim 7 or 8, wherein said storage means comprises a shift register (25), powered by said auxiliary voltage for said predetermined length of time, said shift register comprising a data input, connected to said processor for receiving said identifier data; a data output, connected to said processor for sending said identifier data to said processor; a control input for controlling said data transfers.

11. A machine as claimed in claim 7 or 8, wherein said gating means comprises:
(1) a first logic gate (26), having a first gate input connected to said processor and a second gate input connected to said second comparator output, a first gate output being connected to said data input of said shift register for blocking, under control of said second failure indicating signal, the transfer of said identifier data to said shift register;

(2) a second logic gate (28) having a third gate input connected to said data output of said shift register and a fourth gate input connected to said second comparator output, a second gate output being connected to said processor, for enabling the transfer of said identifier data to said processor under control of said second restart signal;

(3) a third logic gate (34) having a fifth gate input connected to a clock and a sixth gate input connected to said second comparator output, a third gate output being connected to a clock input of said shift register for transferring the clock signal to said register under control of a said second failure indicating signal and said second restart signal.

12. An apparatus as claimed in claim 9, wherein said capacitor having an output connected to one end of a second line whose other end is connected to said first output, said second line including a diode and a transistor, which transistor has its control electrode connected to a third line for receiving said failure indicating signal and said validation signal.

13. An apparatus as claimed in claim 8, wherein said first and second reference power source each comprise a capacitor and a voltage divider, said capacitor being connected to said first output for receiving said secondary supply voltage until said beginning.

14. An apparatus as claimed in claim 1, 9 or 8 which apparatus being a domestic apparatus.

* * * * *